Patented June 5, 1928.

1,672,280

UNITED STATES PATENT OFFICE.

WALTER C. PETERSON, OF DETROIT, MICHIGAN, ASSIGNOR TO PACKARD MOTOR CAR COMPANY, OF DETROIT, MICHIGAN, A CORPORATION OF MICHIGAN.

PROTECTIVE COVERING FOR ALUMINUM BODIES AND PROCESS OF MAKING SAME.

No Drawing. Application filed May 8, 1920. Serial No. 379,772.

This invention relates to protective coverings for aluminum bodies, and processes of making the same.

The object of the invention is to provide a liquid covering adapted to be applied to the surface of castings or other bodies of aluminum with a view to closing the pores of the metal. In particular the invention aims to provide a composition of this character that will closely adhere to the aluminum.

To make the compound, an initial or preliminary composition consisting of 55% to 60% of phenol and 35% to 40% of formaldehyde by weight is formed by mixing and the mixture heated to a temperature of from 180° F. to 210° F. until reduced to one-half of its original volume. It should then have reached the consistency of molasses, whereupon an addition of a hydrous aluminum silicate, preferably kaolin, to the amount of 10% by weight of the whole composition is made, with the result of producing a liquid covering in which the aluminum compound gives the property of a greater attraction for the metal of the aluminum body to which the covering is to be applied than would be the case with a covering composed merely of a phenol-formaldehyde condensation product and hence the pores of the metal are more readily entered and more completely closed.

The covering is applied to the aluminum castings by either dipping or spraying. After application of the covering, baking of the article hastens the hardening of the solution thereon.

In lieu of kaolin it is possible that fuller's earth may be employed and substantially the same result obtained, although it is believed that the kaolin is preferable owing to the fact that it is an aluminum silicate which is hydrous.

Having thus described my invention, what I claim and desire to secure by Letters Patent is:

1. A method of making a liquid covering for aluminum bodies which consists of heating phenol and formaldehyde until the mixture reaches substantially the consistency of molasses and is about one-half of its original volume, and then adding an aluminum silicate of approximately 10% by weight of the final mixture.

2. A method of making a liquid covering for aluminum bodies which consists in heating phenol and formaldehyde together in the proportion of about 60% by weight of the former and 40% of the latter until the mixture has a consistency of approximately that of molasses and is about one-half of its original volume, and then adding a hydrous aluminum silicate to the amount of about 10% by weight of the final mixture.

In testimony whereof I affix my signature.

WALTER C. PETERSON.